(12) United States Patent
Stanciu et al.

(10) Patent No.: US 9,325,549 B2
(45) Date of Patent: Apr. 26, 2016

(54) CONVERTER UNIT FOR AN M-ORDER DIGITAL MODULATION AND A METHOD THEREOF

(71) Applicants: Mihai-Ionut Stanciu, Bucharest (RO); Victor-Florin Crasmariu, Bucharest (RO)

(72) Inventors: Mihai-Ionut Stanciu, Bucharest (RO); Victor-Florin Crasmariu, Bucharest (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/287,574

(22) Filed: May 27, 2014

(65) Prior Publication Data

US 2015/0280647 A1  Oct. 1, 2015

(30) Foreign Application Priority Data

Mar. 27, 2014 (RO) .................................... 14 00237

(51) Int. Cl.
*H04L 27/20* (2006.01)
*H04L 5/00* (2006.01)

(52) U.S. Cl.
CPC ........... *H04L 27/2042* (2013.01); *H04L 5/0007* (2013.01)

(58) Field of Classification Search
CPC .............................. H04L 27/18; H03L 27/20
USPC .................................................. 375/302, 308
See application file for complete search history.

(56) References Cited

U.S. PATENT DOCUMENTS

| | | | |
|---|---|---|---|
| 7,046,738 B1 | 5/2006 | Dent | |
| 7,236,543 B2 | 6/2007 | Wang et al. | |
| 7,916,808 B2 | 3/2011 | Considine et al. | |
| 2007/0058741 A1* | 3/2007 | Inagawa | H04L 25/067 375/260 |
| 2012/0213214 A1* | 8/2012 | Vermani | H04L 5/0039 370/338 |

* cited by examiner

*Primary Examiner* — Kevin Kim (57) ABSTRACT

A converter unit for an M-order digital modulation to map L input binary sequences of N bits onto M complex values being transmitted through a communication channel, where $M=2^N$ and L and N are positive integers. The converter unit comprises an input to receive a respective input binary sequence. The converter unit is arranged to individually convert each N bits of the input binary sequence into a real number to obtain a sequence with N real numbers. The converter unit is arranged to execute complex arithmetic operations on the sequence of real numbers and to compute a respective complex value. The respective complex value corresponds to said respective input binary sequence.

14 Claims, 5 Drawing Sheets

CONVERTER UNIT FOR AN M-ORDER DIGITAL MODULATION AND A METHOD THEREOF

CROSS REFERENCE TO RELATED APPLICATIONS

The present application is claims priority to Romanian Patent Application No. RO A 2014 00237, filed Mar. 27, 2014, entitled "A CONVERTER UNIT FOR AN M-ORDER DIGITAL MODULATION AND A METHOD THEREOF," the entirety of which is herein incorporated by reference.

FIELD OF THE INVENTION

This invention relates to digital modulation and more specifically to digital modulation that maps binary sequences.

BACKGROUND OF THE INVENTION

In communications systems using digital modulation schemes and transmitting information through a communications channel, a conversion of the information from a binary or digital format to an analogue signal is typically required. The information is thus transmitted through the communication channel by for example a signal at a predetermined carrier frequency which is modulated according to the information being transmitted. Any reliably detectable change in or value of a physical parameter (e.g., amplitude, phase, frequency, etc.) of the signal sent by a transmitter of the communications system may reflect the information and, to retrieve the information, the change or value may be detected and demodulated by a receiver of the communications system.

The conversion of the information from the digital format to the analogue signal is typically performed in the transmitter in a converter unit that converts a digital value into a specific value out of a discrete set of M preset values (M being a positive integer), hereinafter referred to as the modulation signal set, for a modulated parameter, for example the phase, the amplitude or the frequency of the modulated signal.

Preceding the conversion, the digital value may be obtained e.g., by forming a symbol of N bits from a binary sequence in a manner that each symbol has a value out of a set of M discrete numbers ($M=2^N$). It is typical that this conversion is performed by first mapping the digital value to a complex symbol or complex value with a real part and an imaginary part out of a set of M complex values, hereinafter referred to as the constellation set, using some predefined mapping scheme. The real part and the imaginary part are then used to define respectively an in-phase component and a quadrature component, i.e., the component with 90° degree phase shift with respect to the in-phase component, of the modulated signal transmitting the information. Thus, each point in the constellation set corresponds one to one to a single point in the modulation signal set.

The complex symbol or complex value converted by the converter unit may be represented in a so called constellation diagram showing the real part of the complex symbol or complex value in the abscissa and the imaginary part of the complex symbol or number in the ordinate. An M-order digital modulation has M complex symbols or complex values. M-order digital modulations of different types also have different constellation diagrams.

U.S. Pat. No. 7,916,808 B2 discloses a modulation circuit that uses pre-calculated and stored data to generate a modulated output. The pre-calculated data are Gaussian filtered sine and cosine responses that are stored in a look-up table of a ROM (Read-only memory). Table 2 at page 3 of U.S. Pat. No. 7,916,808 B2 shows this look-up table that associates for any of the eight theoretical possible complex values of an 8PSK digital modulation plus eight extra complex values rotated of 3π/8 with respected to the theoretical complex values, an in-phase cosine component and a quadrature sine component. The modulated output is then calculated as a sum of values read from the look-up table stored in the ROM.

U.S. Pat. No. 7,236,543 B2 discloses a modulation method and an apparatus for an 8PSK modulation. The modulation method disclosed in U.S. Pat. No. 7,236,543 B2 comprises the steps of mapping the input symbols, generating look-up table addresses, looking-up the table and processing the data, and accumulating, summing and outputting the modulated signals.

In any of the mentioned prior art documents a look-up table is used that associates with indexes or addresses stored in a memory all digital values formed by all possible theoretical binary sequences of the 8PSK digital modulation to the corresponding complex values in the constellation diagram. In other words, the conversion of the digital value, formed by the binary sequence, into the complex value is provided off-the-shelf in a memory with a look-up table.

SUMMARY OF THE INVENTION

The present invention provides a converter unit, an integrated circuit, a transmitter, and a method and a computer readable medium as described in the appended claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the FIGS. are illustrated for simplicity and clarity and have not necessarily been drawn to scale. In the FIGS., elements which correspond to elements already described may have the same reference numerals.

DETAILED DESCRIPTION OF THE PREFERRED EMBODIMENTS

Figure 1:
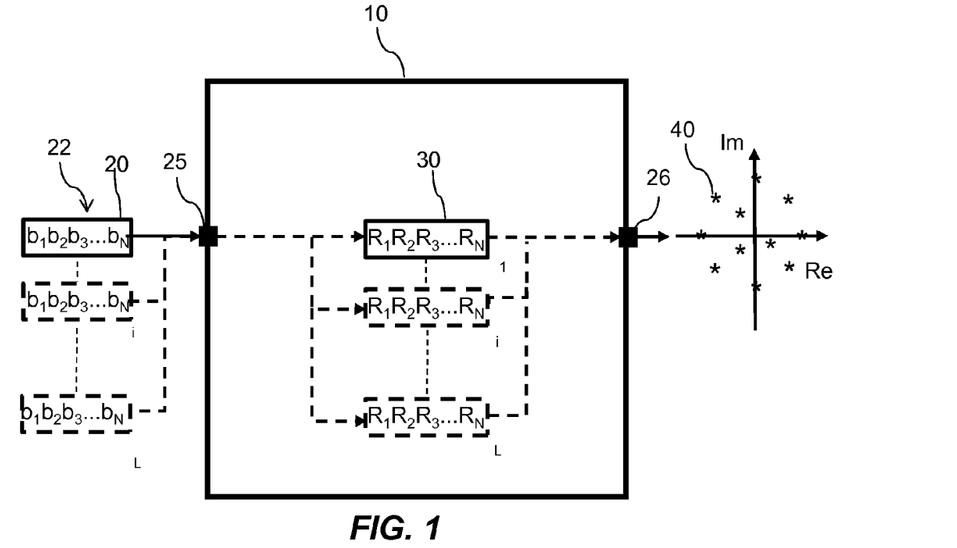
FIG. 1 schematically shows an example of an embodiment of a converter unit.

FIG. 1 schematically shows a converter unit used for an M-order digital modulation scheme The M-order digital modulation scheme may be any suitable type of digital modulation scheme, e.g., an M-order phase shift keying digital modulation or an M-order quadrature amplitude digital modulation.

The converter unit is arranged to map L digital values, e.g., formed by input binary sequences 22 onto corresponding M mapped complex values. In this respect, it should be noted that in the following, unless explicitly stated otherwise the term "complex", e.g., as in "complex values", "complex calculations", etc., refers to the mathematical notion of "complex", i.e., with concerning numbers comprising a real part and an imaginary part in the complex space $\mathbb{C}$. The converter unit 12 may be used to map any number of input sequences (of any number of bits) onto respective complex values for any suitable type of modulation.

Each of the N bits $b_1, b_2, b_3, \ldots, b_N$ of the L input binary sequences 22 forming the digital value or digital symbol may have only a value of 0 or 1, so that $2^N$ combinations of the two values may be formed. Each input binary sequence of the L input binary sequences 22 thus includes N bits, where L and N are positive integers and $M=2^N$. Each of the N bits $b_1, b_2, b_3, \ldots, b_N$ comprises data in the digital format that may be transmitted through a communications channel of a digital communications system. The value of L depends on the transmitted data.

The converter unit 10 shown in FIG. 1 includes an input 25 at which a respective input binary sequence 20 of the L input binary sequences 22 can be received. As shown in FIG. 1, the converter unit 10 may receive any combination of the N bit values through the input 25 at a time. The order in which the converter unit 10 can receive the L input binary sequences 22 may be dependent on the transmitted data through the communication channel. The converter unit 10 is arranged to convert each of the N bits $b_1, b_2, b_3, \ldots, b_N$ of the respective input binary sequence 20 of the L input binary sequences 22 into a real number $R_1, R_2, R_3, \ldots, R_N$, to obtain a sequence 30 of N real numbers $R_1, R_2, R_3, \ldots, R_N$ corresponding to the input binary sequence 20, i.e. to the digital value or symbol to be converted. In FIG. 1, the dashed line between the input 25 and the sequence 30 of real numbers indicates that any one of the received of the L input binary sequences 22 may be processed by the converter unit 10. The dashed line between the sequence of real numbers 30 and the output 26, indicates that further processing may be performed by the converter unit 10 on the sequence of real numbers 30.

The converter unit 10 is further arranged to execute complex arithmetic operations on the N real numbers $R_1, R_2, R_3, \ldots, R_N$ of the sequence of real numbers 30 to compute a corresponding complex value 40 out of the mapped M complex values on which the sequence 30 is mapped. The complex value 40 maps the original digital value formed by the input binary sequence 20 into a complex value with a real part and an imaginary part out of a set of M complex values, i.e. the constellation set. Thus, the mapped complex value 40 corresponds to the original digital value formed by the input binary sequence 20. Similarly, the L input binary sequences 22 can be mapped into corresponding ones of the M complex values out of the constellation set. Different M-order digital modulation schemes have different constellation sets representing the corresponding M complex values in the complex plane. The M-order digital modulation scheme may for example be an eight order phase shift keying digital modulation (8-PSK) scheme which has a constellation set with eight nominal locations in the complex plane distributed along a circumference with the centre at the origin of the complex plane, as shown in the constellation diagram of FIG. 3.

In other words, to obtain the respective complex value 40 out of the M complex values, each of the N bits $b_1, b_2, b_3, \ldots, b_N$ of the respective input binary sequence 20 is initially converted into a corresponding real number $R_1, R_2, R_3, \ldots, R_N$. In this way a representation of the input binary sequence 20 into a respective sequence of real numbers 30 is obtained. The further respective sequence of real numbers 30 is then used by the converter unit 10 to further execute complex arithmetic operations on the N real numbers $R_1, R_2, R_3, \ldots, R_N$ to obtain the respective complex value 40.

Thereby, the need of a look-up table that may be typically used to directly map each one of the L input digital values onto the M mapped complex values of the constellation set associated with the used M-order digital modulation scheme, may be obviated.

The converter unit 10 converts each of the N bits $b_1, b_2, b_3, \ldots, b_N$ individually into a corresponding real number $R_1, R_2, R_3, \ldots, R_N$. The converted real number $R_1, R_2, R_3, \ldots, R_N$ has no direct relation with the mapped respective complex value 40. The relation between the individual real number of a sequence and the mapped respective complex value 40 is defined via complex arithmetic operations on N real numbers $R_1, R_2, R_3, \ldots, R_N$. The corresponding individual N real numbers $R_1, R_2, R_3, \ldots, R_N$, may for example be stored with a floating point representation, and be used by the converter unit 10 to execute complex arithmetic operations on the floating point representations to map the respective input binary sequence 20 onto a respective complex value 40.

Figure 2:
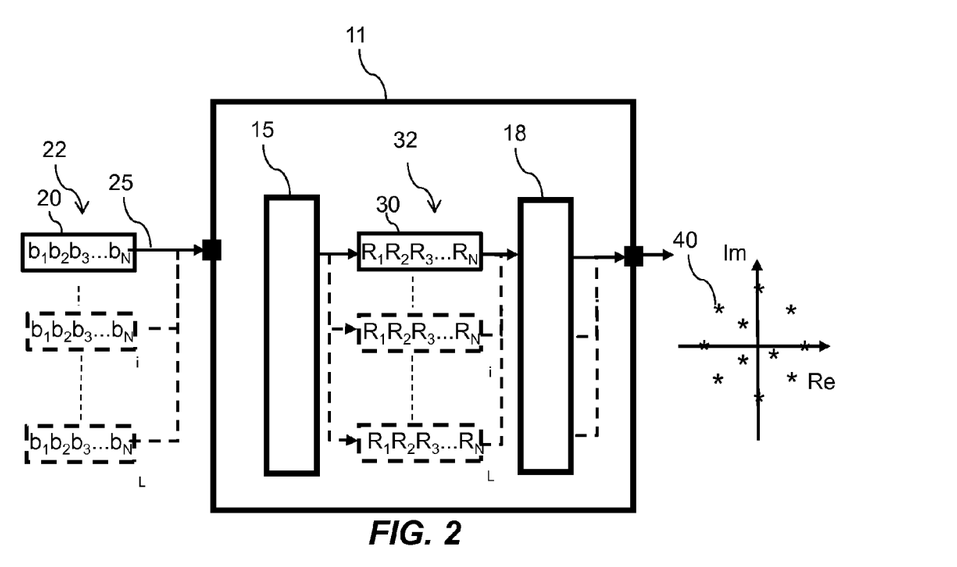
FIG. 2 schematically shows an example of an embodiment of a converter unit.

The converter unit 10 may be implemented in any manner suitable for the specific implementation, such as a part of a microprocessor, for example a microcontroller, a digital signal processor or a digital signal controller. For example, the converter unit 10 may be a processor core or a dedicated hardware accelerator peripheral, and may for example be implemented in, or as, a suitably programmed microprocessor, such as general purpose microprocessor, a microcontroller, a digital signal processor or other suitable type of microprocessor with As shown in FIG. 2, the converter unit 11 may include a digital processor 15, such as a general purpose processing core, and a vector signal processor (VSP) 18. The digital processor may be arranged to convert each of the N bits $b_1, b_2, b_3, \ldots, b_N$ into the corresponding real number $R_1, R_2, R_3, \ldots, R_N$ (or a corresponding floating point representation of the real number $R_1, R_2, R_3, \ldots, R_N$). The vector signal processor 18 may be arranged to execute the complex arithmetic operation on the N real numbers $R_1, R_2, R_3, \ldots, R_N$ to obtain the respective mapped complex value 40.

The VSP 18 may be any suitable of VSP, such as a stand-alone microprocessor, and may for example be implemented as part of a microprocessor. The microprocessor may be a general purpose microprocessor, a microcontroller, a digital signal processor or other suitable type of microprocessor with vector signal processing cores or coprocessors. The microprocessor may for example comprise one, two or more vector processing cores, that is a central processing units (CPU or cores) or coprocessors, which implement an instruction set containing instructions that operate on arrays of data. In other words the cores or coprocessors may be enhanced for the execution of complex arithmetic operations in parallel by using multiple parallel arithmetic units. Additionally, the microprocessor may comprise one or more peripherals, such as hardware accelerators, I/O ports, co-processors or otherwise, and/or memory, such as volatile or non-volatile memory, for example on-chip flash or RAM. The VSP 18 may be arranged to execute complex arithmetic operations on the N real numbers $R_1, R_2, R_3, \ldots, R_N$ to obtain the respective mapped complex value 40 out of the M complex values. The VSP 18 may be a processor which is enhanced to execute arithmetic operations with complex numbers. The VSP 18 may execute operations as changing the sign of a real number, calculating the modulus of a real number, making addition, subtraction and multiplication of complex values. In other words, the vector signal processor 18 may be a highly specialized processor optimized for the execution of complex arithmetic operations in parallel by using multiple parallel arithmetic units.

The VSP 18 may be configured to execute during a clock cycle at least two complex arithmetic operations on the N real numbers. When the VSP 18 is used, the complex arithmetic operations on the N real numbers $R_1, R_2, R_3, \ldots, R_N$ may be executed faster and the mapping of the digital values formed by the input binary sequences 22 onto complex values may be executed more efficiently.

The vector signal processor may for example have a predetermined clock frequency equivalent to 128 MHz and may for example be capable of performing in a single clock cycle either 8 real arithmetical operations that consists of one multiplication and one addition, or 2 complex arithmetical operations that consists of one multiplication and one addition.

Figure 3:
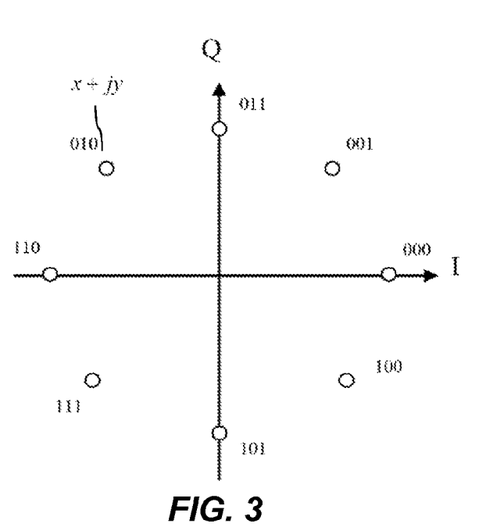
FIG. 3 schematically shows a constellation diagram for an eight order phase shift keying digital modulation.
Figure 4:
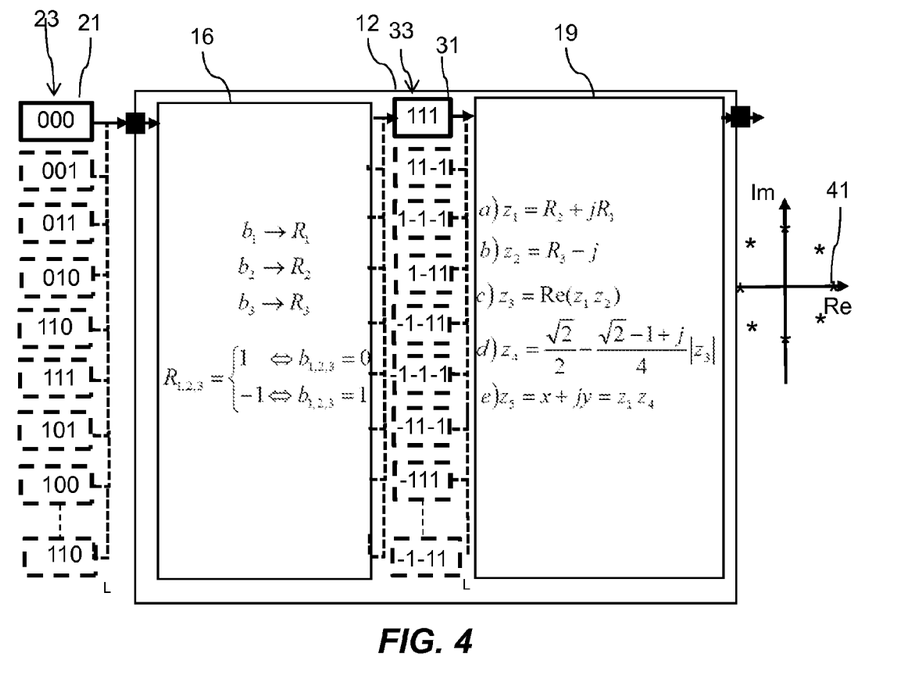
FIG. 4 schematically shows an example of an embodiment of a converter unit for an eight order phase shift keying digital modulation.

Referring to FIG. 4, the converter unit 12 may for example be used in a 8-PSK modulation scheme to map L input binary sequences, each binary sequence having a digital value out of a set of eight digital values, onto corresponding eight complex values of the constellation set. The constellation set of an 8-PSK as represented in the complex plane is shown in FIG. 3. The number of complex values of the constellation set is equivalent to the modulation order, which is in this case eight. The eight complex values have a constant modulus, thus the phase shift keying modulation introduces only a phase modulation in the modulated signal carrying the information transmitted through the communication channel. Each one of the L input binary sequences 23 in the eight-order phase shift keying digital modulation comprises three bits $b_1, b_2$ and $b_3$. Each of the three bits $b_1, b_2$ or $b_3$ may be a binary 0 or 1. The combination of the two bit values of the bits $b_1, b_2$ and $b_3$ determines each one of the L input binary sequences 23. For example, the input binary sequence 21 shown in FIG. 4 is a sequence of binary zeroes. In this example the converter unit 12 may include a digital processor 16 arranged to convert each individual bit $b_1, b_2$ and $b_3$ of an L input binary sequence onto a corresponding real number $R_1, R_2$ or $R_3$ respectively. In FIG. 4, $b_1$ is converted into $R_1$, $b_2$ is converted into $R_2$ and $b_3$ is converted into $R_3$. The input binary sequence 21 of 3 bits is thus converted into the sequence 31 of real numbers with a first real number $R_1$ corresponding to a first bit $b_1$ of the respective input binary sequence 21, a second real number $R_2$ corresponding to a second bit $b_2$ of the respective input binary sequence 21 and a third real number $R_3$ corresponding to a third bit $b_3$ of the respective input binary sequence 21.

In the example shown in FIG. 4, the first real number $R_1$, the second real number $R_2$ and the third real number $R_3$ of the respective input binary sequence 21 are equivalent to 1. Each of the individual three bits $b_1, b_2$ and $b_3$ equivalent to a binary 0 may be converted into a corresponding real number $R_1, R_2$ or $R_3$ equivalent to 1 and each of the individual three bits $b_1, b_2$ and $b_3$ equivalent to a binary 1 may be converted into corresponding real number $R_1, R_2$ or $R_3$ equivalent to −1. In this way, the L input binary sequences 23 are converted into L corresponding further sequences 33 of three real numbers $R_1$, $R_2, R_3$ wherein each of the three real numbers $R_1, R_2$ and $R_3$ may be 1 or −1 according to the values of the three bits $b_1, b_2$ and $b_3$ in the L input binary sequences 23. The converter unit 12 shown in FIG. 4 further includes a vector signal processor 19 configured to execute complex arithmetic operations on the three real numbers $R_1, R_2$ and $R_3$ of each of the L corresponding further sequences 33 converted by the digital processor 16.

The vector signal processor 19 is configured in this example to execute the following complex arithmetic operations on the real numbers $R_1, R_2$ and $R_3$ of the sequences of real numbers 33:

a) compute a first sum $z_1$ of the first real number $R_1$ multiplied by the imaginary number j, with the second real number $R_2$:

$$z_1 = R_2 + jR_1 \qquad (1)$$

b) compute a difference $z_2$ of the third real number $R_2$ and the imaginary number j:

$$z_2 = R_3 - j \qquad (2)$$

c) compute a real part $z_3$ of a first multiplication of the first sum $z_1$ with the said difference $z_2$:

$$z_3 = Re(z_1 z_2) \qquad (3)$$

d) compute a second sum $z_4$ of a first number equivalent to $$\frac{\sqrt{2}}{2}$$

with a second multiplication of a second number equivalent to $$-\frac{\sqrt{2}-1+j}{4}$$

with the modulus of said real part $z_3$:

$$z_4 = \frac{\sqrt{2}}{2} - \frac{\sqrt{2}-1+j}{4}|z_3| \qquad (4)$$

e) compute the respective complex value 41 corresponding to the respective input binary sequence 21 of the three bits $b_1, b_2, b_3$ as a third multiplication $z_5$ of said first sum $z_1$ with said second sum $z_4$:

$$z_5 = X + jy = z_1 z_4 \qquad (5)$$

The vector signal processor 19 of FIG. 4 is thus configured to execute the complex arithmetic operations (1) to (5) on the real numbers $R_1, R_2$ and $R_3$ in order to map the input binary sequences 23 onto the eight complex values of the constellation diagram of the eight order phase shift keying digital modulation shown in FIG. 3.

The constellation diagram of FIG. 3 is one of the many possible constellation diagrams for an eight order phase shift keying digital modulation. The constellation diagram of FIG. 3 may be rotated with respect to the origin of real/imaginary complex diagram. For example the constellation diagram may be rotated by $$k\frac{\pi}{8},$$

where k is an integer positive or negative, and the converter unit 12 may further compute a further respective complex value corresponding to the previously mentioned respective complex value 41 but rotated by $$k\frac{\pi}{8}.$$

The further respective complex value may be computed as a fourth multiplication $z_6$ of the previously mentioned respective complex value 41 by $$e^{jk\frac{\pi}{8}}:$$

$$z_6 = z_5 e^{jk\frac{\pi}{8}} \qquad (6)$$

For example the vector signal processor 19 may be further configured to execute also this fourth multiplication $z_6$.

Figure 5:
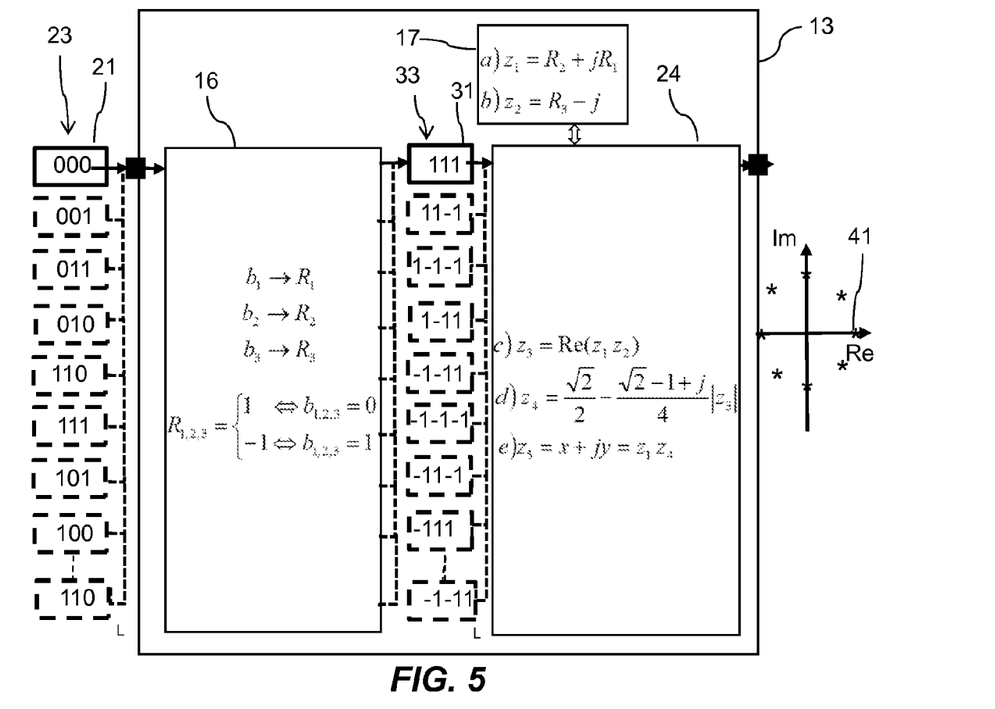
FIG. 5 schematically shows another example of an embodiment of a converter unit used for an eight order phase shift keying digital modulation.

In the example of a converter unit 13 shown in FIG. 5 the converter unit 13 further includes a memory 17. The memory 17 may be configured to store the first real number $R_1$ and the second real number $R_2$ in a first line array of the memory 17. The first line array of the memory 17 may be used to compute the first sum $z_1$ of the first real number $R_1$ multiplied by the imaginary number j, with the second real number $R_2$ as described in the above mentioned step (a) and shown by the equation (1). The memory 17 may be further configured to store the third real number $R_3$ and the imaginary number j in a second line array of the memory 17 to compute the difference $z_2$ of the third real number $R_3$ and the imaginary number j as described in the above mentioned step (b) and by the equation (2). The first real number $R_1$, the second real number $R_2$ and the third real number $R_3$ may be stored with a predetermined accuracy in the memory 17. The predetermined accuracy may use a floating point representation of the real numbers and together with the accuracy with which the complex arithmetic operations are performed in the vector signal processor 24 may determine the accuracy of the mapped respective complex value 41 and of all eight corresponding complex values. The predetermined accuracy with which the first, the second and the third real numbers $R_1$, $R_2$ and $R_3$ may be stored in the memory 17, may determine how close the floating point representation of said real numbers is to the corresponding real number.

Figure 6:
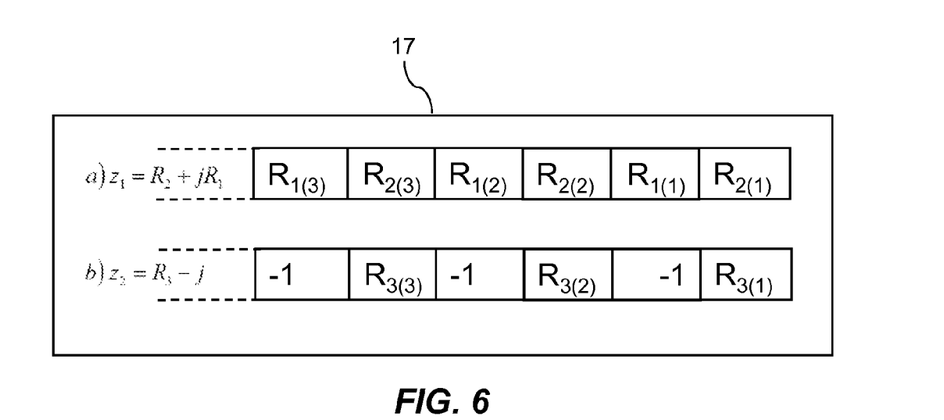
FIG. 6 shows a memory structure used in the example of the converter unit shown FIG. 5.

FIG. 6 shows a structure of the memory 17 suitable for the example of FIG. 5. FIG. 6 shows a first array of the memory 17 that may be used to store respectively the imaginary part $R_1$, i.e. the first real number $R_1$, and the real part $R_2$, i.e. the second real number $R_2$, of the first sum $z_1$ for the combination of the values of the imaginary part $R_1$ and the real part $R_2$ corresponding to the combination of the bits $b_1$, $b_2$ and $b_3$ in the input binary sequences 23. The suffix between brackets indicates the corresponding sequence: $R_{1(1)}$ and $R_{2(1)}$ are values corresponding to a first input binary sequence of the L input binary sequences 23, $R_{1(2)}$ and $R_{2(2)}$ are values corresponding to a second input binary sequence of the L input binary sequences, etc. The order with which the memory 17 may store the real numbers $R_{1(i)}$ and $R_{2(i)}$ corresponding to an input binary sequence i of the L input binary sequences 23, may be different than the order shown in FIG. 6. The order with which the memory 17 may store the real numbers $R_{1(i)}$ and $R_{2(i)}$ may depend by the order with which the L input binary sequences may be received by the converter unit 13. This order depends upon the information to be transmitted from the transmitter to the receiver through the communications channel.

FIG. 6 additionally shows a second array of the memory 17 that may be used to store respectively the imaginary part $-1$ and the real part $R_3$ of the difference $z_2$ for the combinations of the values of the imaginary part $-1$ and the real part $R_3$ corresponding to the three bits $b_1$, $b_2$ and $b_3$ in the respective input binary sequences 23. As in the first array, also in the second array of the memory 17, the order with which the real numbers $R_{3(i)}$ and $-1$ may be stored in the memory 17 shown in FIG. 6 is purely indicative.

By using the memory 17 the combinations of the values of the real parts and imaginary parts of the first sum $z_1$ and the difference $z_2$ corresponding to the input binary sequences 23 may be read and processed by the vector signal processor 24 in parallel. By reading and processing in parallel said real parts and said imaginary parts the amount of complex arithmetic operations executed by the vector signal processor 24 to obtain the eight complex values of the constellation diagram of the eight order phase shift keying digital modulation shown in FIG. 3, is minimized or at least reduced. It should be noted that the memory 17 is schematically drawn in FIG. 5 as an external component of the vector signal processor 24. Alternatively the memory 17 may be part of the vector signal processor 24 or integrated into the vector signal processor 24. The memory 17 may be for example integrated together with the vector signal processor 24 in an integrated circuit or the integrated circuit may include the converter unit 13 of FIG. 5.

To explain further and by way of example, an estimation of a computation cycle consumption of the vector signal processor 24 in combination with the memory 17 is given.

If the vector signal processor 24 is used in conjunction with the memory 17 and the vector signal processor 24 is capable to load and store a real part or imaginary part of a complex value and a modulus of a complex value in the same cycle, the vector signal processor 24 instead of executing all the complex arithmetic operations a) to e) may execute only a subset of said complex arithmetic operations. In this last example the subset of complex arithmetic operations that may be executed by the vector signal processor 24 may include operations c) to e), i.e.:

1. the first multiplication of the first sum $z_1$ with the difference $z_2$ and storing the real part $z_3$ of said first multiplication,
2. the second multiplication of a second number equivalent to $-(\sqrt{2}-1+j)/4$ with the modulus of said real part $z_3$, and the second sum $z_4$ of the first number equivalent to $\sqrt{2}/2$ with said second multiplication, and
3. the third multiplication $z_5$ of said first sum $z_1$ with said second sum $z_4$.

If the vector signal processor 24 is further capable to execute a sum and a multiplication in one single operation, then according to the above three operations, the total number of operations executed by the vector signal processor 24 is equivalent to three.

It is also assumed that P is a number of elements or a degree of vectorization of the vector signal processor 24, i.e. an amount of complex arithmetic operations that the vector signal processor 24 may simultaneously perform. It is additionally assumed that C is the average number of cycles a complex arithmetic operation may require for each element of the number of elements P. The average number of cycles C includes the number of cycles required to load and store the real numbers from and into the memory 17 and to organize the real numbers in the memory 17. With the above assumptions, a total computation cycle consumption per bit for the 8-PSK digital modulation so far described with the eight input binary sequences 23 of three bits $b_0$, $b_1$ and $b_2$ may be estimated as:

$$\text{Cycles per bit} = \frac{3[\text{operations}] \cdot C[\text{cycles/operation/element}]}{3[\text{bits}] \cdot P[\text{elements}]} = \frac{C}{P} \quad (7)$$

If one assumes that the vector signal processor 24 has a degree of vectorization equivalent to 2, then P is equivalent to 2 and further assumes that the vector signal processor 24 is configured to execute on average the complex arithmetic operations listed above through the steps 1 to 3, in one cycle, then C is equivalent to 1, which results in 0.5 cycles per bit.

Figure 7:
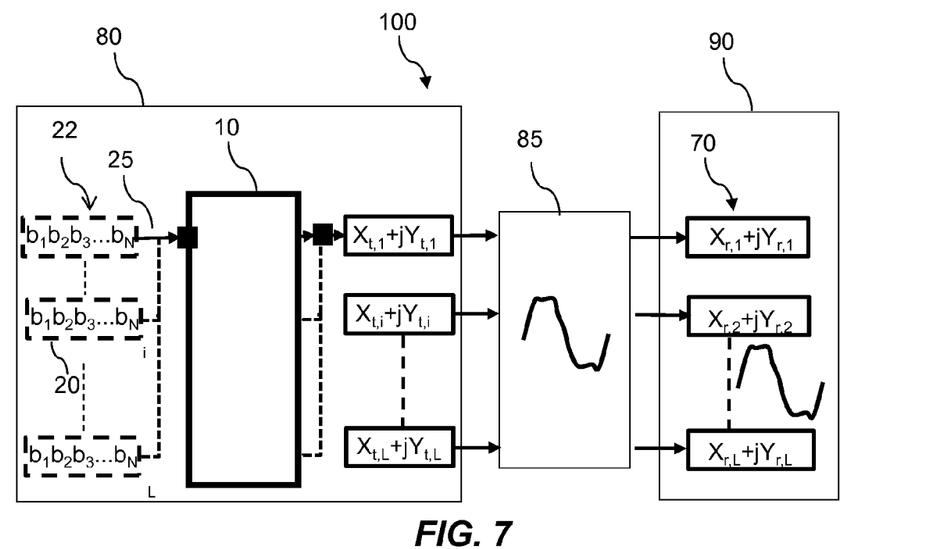
FIG. 7 schematically shows an example of an embodiment of a communications system.

FIG. 7 shows an example of communications system 100 using an M-order digital modulation. A transmitter 80 of the communications system 100 includes a converter unit 10 which may be implemented as in the previous examples. As previously described, L-input binary sequences 22 are received by the converter unit 10 in the transmitter 80 and mapped onto corresponding M complex values $X_{t,i}+jY_{t,i}$ out of a discrete set of values, i.e. the constellation set. The constellation set has M complex values in a M-order digital modulation scheme. These M complex values $X_{t,i}+jY_{t,i}$ have a real part and imaginary part used to define respectively an in-phase component and a quadrature component of the modulated signal transmitting the information. The information is typically sent via a modulated signal through a communication channel 85 to a receiver 90. The receiver 90 receives the signal carrying the information, detects and demodulates the signal and reconstructs the information from the demodulated signal. A value of a modulated parameter of the received signal is determined, at the receiver 90, after the modulated signal is received, and a complex value is construed from the determined value. A predetermined complex value to which the construed complex value corresponds is then sought, e.g., by using a maximum likelihood algorithm or otherwise, i.e. mapped back to a, reconstructed, target value out of the constellation set of the specific digital modulation scheme and the digital value assigned to that target value is outputted. The construed complex value $X_{r,i}+jY_{r,i}$ may be moved away from the original positions of the M predetermined complex values $X_{t,i}+jY_{t,i}$ out of the constellation set of M discrete complex values. The digital communications system 100 shown in FIG. 7 may be used in orthogonal frequency division multiple access systems, i.e. OFDM, or in code division multiple access systems, i.e. CDMA. The digital communications system 100 may be any suitable communications system arranged, for example, to perform phase shift keying modulation.

Figure 8:
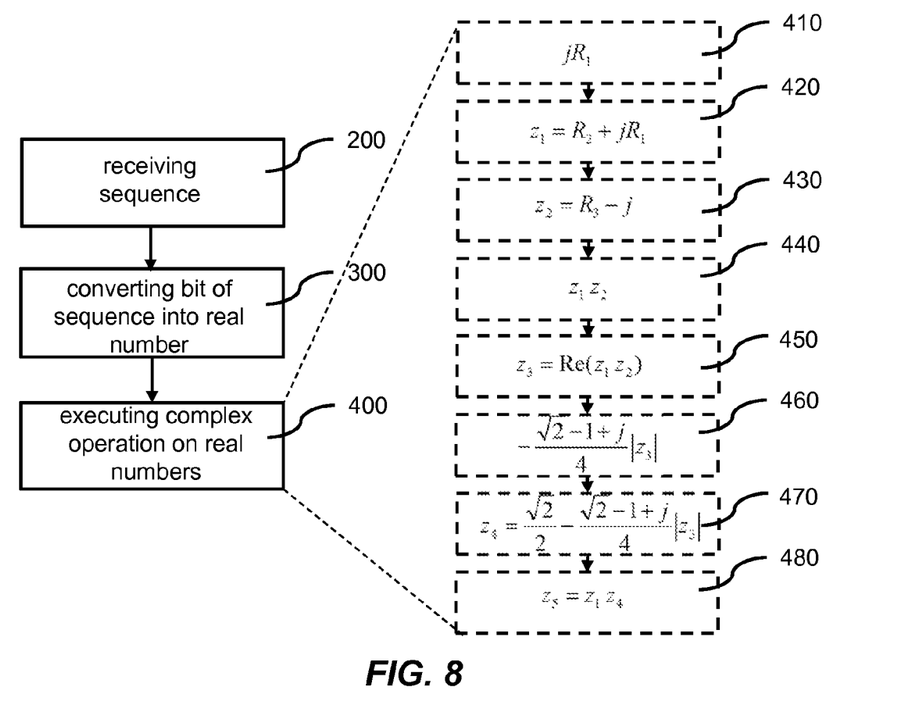
FIG. 8 shows a flow chart of a method of mapping M input binary sequences onto complex values for an M order digital modulation.

FIG. 8 schematically shows a flow chart of a method of mapping L input binary sequences 22 of N bits onto corresponding M complex values that are transmitted through a communication channel, with $M=2^N$, and L and N being positive integers. The method includes:

(i) receiving 200 an input binary sequence 20,
(ii) converting 300 each individual bit of the respective input binary sequence 20 into a real number, to obtain a sequence of real numbers 30 corresponding to the input binary sequence 20, and
(iii) executing 400 complex arithmetic operations on the N real numbers of the sequence of real numbers 30 to compute a respective complex value 40 out of the M complex values, corresponding to the input binary sequence 20.

As mentioned with reference to the description of FIG. 2 executing 400 complex arithmetic operations may be performed in parallel for at least two complex arithmetic operations by using for example a suitable vector signal processor 18.

It should be further noted that if the M-order digital modulation is an 8-PSK digital modulation as for the example shown through the FIGS. 3 to 6, the L input binary sequences are 8 input binary sequences 23 of three bits $b_1$, $b_2$ and $b_3$ each, and the converting 300 converts each individual bit $b_0$, $b_1$ and $b_2$ of an input binary sequence onto one corresponding real number $R_1$, $R_2$ and $R_3$. Executing 300 complex arithmetic operations may optionally include:

(iv) multiplying 410 the first real number $R_1$ by the imaginary number j to obtain a first intermediate product,
(v) summing 420 the first intermediate product with the second real number $R_2$ to obtain a first sum $z_1$ as shown in equation (1),
(vi) subtracting 430 the third real number $R_3$ and the imaginary number j to obtain a difference $z_2$ as shown in equation (2),
(vii) multiplying 440 the first sum $z_1$ with said difference $z_2$ to obtain a second intermediate product,
(viii) compute 450 a real part of said second intermediate product to obtain the real part $z_3$ as shown in equation (3),
(ix) multiplying 460 a second number equivalent to $-(\sqrt{2}-1+j)/4$ with the modulus of said real part $z_3$ to obtain a third intermediate product,
(x) summing 470 a first number equivalent to $\sqrt{2}/2$ with said third intermediate product to obtain a second sum $z_4$ as shown in equation (4),
(xi) multiplying 480 the first sum $z_1$ with second sum $z_4$ to obtain the respective complex value 41 corresponding to the respective input binary sequence 21 as shown in equation (5).

The method above described is performed for each of the binary sequences 23 in order to obtain the corresponding eight respective complex values of the 8-PSK constellation diagram. The method may be performed by a converter unit or by any other device suitable for the specific implementation.

Figure 9:
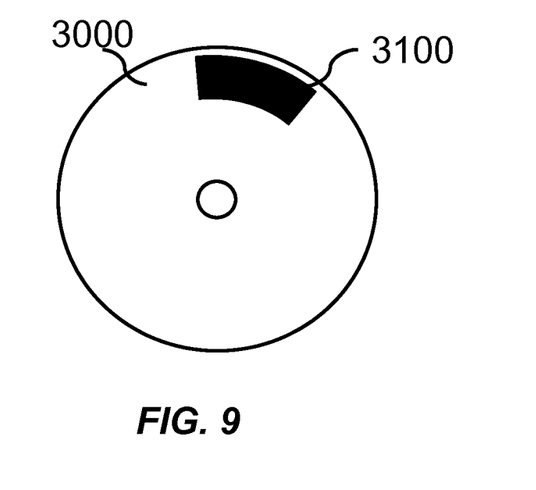
FIG. 9 shows a computer readable medium.

FIG. 9 shows an example of a tangible non-transistor computer readable medium 3000 on which data is stored representing a computer program 3100 for running on a processor unit, at least including code portions for performing a method mapping L input binary sequences 22 of N bits onto corresponding M complex values as previously described when run on a programmable apparatus, such as a converter unit. The computer program 3100 may be embodied on the computer readable medium 3000 as physical marks or by means of magnetization of the computer readable medium 3000. However, any other suitable embodiment is conceivable as well. The computer readable storage medium may be stored internally to the programmable apparatus or connectable thereto via a transmission medium. The computer readable media may be permanently, removably or remotely coupled to the programmable apparatus. Furthermore, it will be appreciated that, although the computer readable medium 3000 is shown in FIG. 6 as an optical disc, the computer readable medium 3000 may be any suitable computer readable medium, such as a hard disk, solid state memory, flash memory, etc., and may be non-recordable or recordable.

Figure 10:
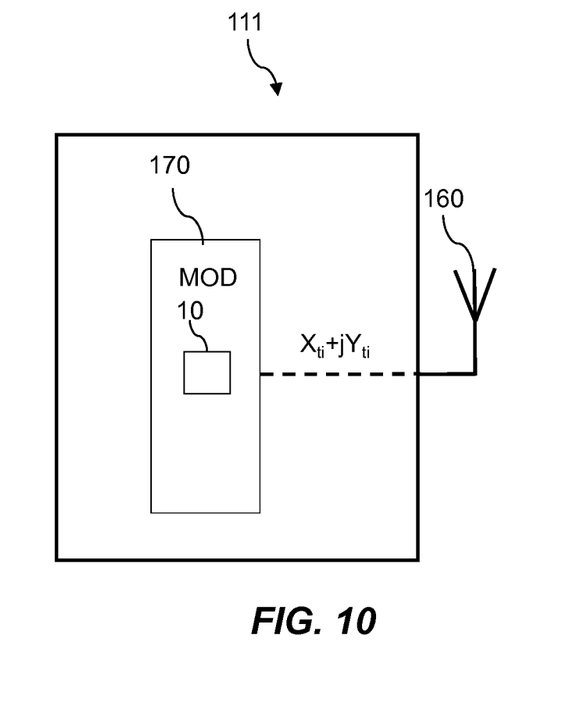
FIG. 10 shows an example of a transmitter.

FIG. 10 shows an example of a transmitter 111. The transmitter 111 comprises a modulator MOD which modulates a modulated signal by determining a complex values of a discrete set of M preset complex values according to a predetermined mapping of an M-order digital modulation scheme. The modulator MOD may comprise the converter unit 10, 11, 12, or 13 as previously described through the FIGS. 1-4, and 5 to map each digital value onto the complex value. The transmitter 111 further comprises a transmitter antenna 160 to transmit the modulated signal with a modulated parameter (e.g., amplitude, phase, frequency, etc.) over a communication channel. The modulated parameter has a complex value out of the discrete set of M preset complex values.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the specific examples shown. For example, devices illustrated in the FIGS. functionally forming separate devices may be integrated in a single physical device. Also, the units and circuits may be suitably combined in one or more semiconductor devices. For example the converter units 10, 11, 12 or 13 shown through FIG. 1, 2 4 or 5 may be integrated in a single integrated circuit with the digital processor 15 or 16 and with the vector signal processor 18, 19 or 24 and with the memory 17. Alternatively for example any of the digital processors 15 or 16 shown in the FIGS. 2, 4 and 5 may be integrated in a separated integrated circuit than an integrated circuit wherein the vector signal processor 18, 19 or 24 is integrated. Similarly the memory 17 may be integrated in another separated integrated circuit than the integrated circuit wherein the vector signal processor 18, 19 or 24 and/or the digital processors 15 or 16 are integrated.

However, other modifications, variations and alternatives are also possible. The specifications and drawings are, accordingly, to be regarded in an illustrative rather than in a restrictive sense. For example the method illustrated with the flow chart of FIG. 8 and above described through (i) to (xi) may be alternatively implemented by for example changing the order (i) to (xi): for example (vi) may be performed before (iv).

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

The invention claimed is:

1. A converter unit for an M-order digital modulation, the convertor unit being arranged to map L input binary sequences of N bits onto M complex values, the M complex values being transmitted through a communication channel, $M=2^N$, L and N being positive integers, the converter unit comprising:
   an input for receiving a respective input binary sequence, the converter unit being arranged to individually convert each N bits of the input binary sequence into a real number to obtain a sequence of real numbers with N real numbers, corresponding to the input binary sequence, the converter unit being arranged to execute complex arithmetic operations on the sequence of real numbers, to compute a respective complex value of the M complex values, the respective complex value corresponding to said respective input binary sequence, and to map the computed M complex values onto a single constellation diagram;
   wherein the M-order digital modulation is an eight-order Phase Shift Keying, the respective input binary sequence of N bits has three bits and the sequence with N real numbers has three real numbers; and
   wherein the real number of the sequence is equivalent to 1 when the corresponding bit of the input binary sequence is equivalent to a binary 0, wherein the real number is equivalent to $-1$ when the corresponding bit of the respective input binary sequence is equivalent to a binary 1, and wherein the converter unit is arranged to:
   compute a first sum of a first real number multiplied by the imaginary number j, with a second real number,
   compute a difference of a third real number and the imaginary number j,
   compute a real part of a first multiplication of the first sum with said difference,
   compute a second sum ($z_4$) of a first number equivalent to $$\frac{\sqrt{2}}{2}$$

with a second multiplication of a second number equivalent to $$-\frac{\sqrt{2}-1+j}{4}$$

with the modulus of said real part, and
   compute the complex value corresponding to the input binary sequence as a third multiplication of said first sum with said second sum.

2. A converter unit according to claim 1, further comprising a processor arranged to convert each one of the N bits of the respective input binary sequence into the real number, and a vector signal processor arranged to execute the complex arithmetic operations on the N real numbers.

3. A converter unit as claimed in claim 2, wherein the vector signal processor has a predetermined clock frequency, and wherein the vector signal processor is further arranged to execute in parallel at least two complex arithmetic operations in a same clock cycle.

4. A converter unit as claimed in claim 1, wherein the M-order digital modulation is an M-order Phase Shift Keying.

5. A converter unit as claimed in claim 1, further arranged to compute a further complex value as a fourth multiplication of the third multiplication by $$e^{jk\frac{\pi}{8}},$$

wherein k is an integer positive or negative, to obtain the further complex value rotated by $$k\frac{\pi}{8}$$

with respect to the respective complex value.

6. A converter unit as claimed in claim 1 comprising a memory arranged to store the first real number and the second real number in a first line array of the memory with a first predetermined precision to compute the first sum, and for storing the third real number and the imaginary number j in a second line array of the memory with the same first predetermined accuracy to compute the difference, wherein the first predetermined accuracy and an accuracy of the arithmetic operations executed by the converter unit determine the accuracy of the mapped respective complex value.

7. An integrated circuit comprising the converter unit as claimed in claim 1.

8. A transmitter for transmitting data through a communications channel, comprising
    a modulator for modulating a modulated signal by determining a complex value out of a discrete set of M preset complex values, M positive integer, according to a predetermined mapping of a M-order digital modulation, the modulator comprising the converter unit as claimed in claim 1, and
    a transmitter antenna electrically coupled the modulator for transmitting the modulated signal over a communication channel, the modulated signal comprising a modulated parameter having a complex value out of the discrete set of M preset complex values.

9. A digital communications system comprising the converter unit as claimed in claim 1, and further a receiver, a receiver antenna and a demodulator.

10. A digital communications system as claimed in claim 9, arranged to perform orthogonal frequency division multiple access, OFDMA, or code division multiple access, CDMA, or phase shift keying, PSK, modulation.

11. A method of mapping L input binary sequences of N bits onto M complex values, the M complex values being transmitted through a communication channel, $M=2^N$, being L and N positive integers, the method comprising:
    receiving a respective one of the L input binary sequences;
    converting individually each N bits of the input binary sequence into a real number to obtain a sequence of real numbers with N real numbers corresponding to the respective input binary sequence;
    executing complex arithmetic operations on the sequence of real numbers to compute a respective complex value of the M complex values, the respective complex value corresponding to said respective input binary sequence, wherein the executing further comprises:
        multiplying a first real number by the imaginary number j to obtain a first intermediate product,
        summing the first intermediate product with a second real number to obtain a first sum,
        subtracting a third real number and the imaginary number j to obtain a difference,
        multiplying the first sum with said difference to obtain a second intermediate product,
        compute a real part of said second intermediate product to obtain a real part,
        multiplying a second number equivalent to $$-\frac{\sqrt{2}-1+j}{4}$$

with the modulus of said real part to obtain a third intermediate product,
        summing a first number equivalent to $$\frac{\sqrt{2}}{2}$$

with said third intermediate product to obtain a second sum, and
        multiplying the first sum with second sum to obtain the respective complex value corresponding to the respective input binary sequence; and
    mapping the computed M complex values onto a single constellation diagram, wherein the M-order digital modulation is an 8-PSK modulation, the respective input binary sequence of N bits has three bits, the sequence of real numbers has three real numbers, and wherein the converting converts the bit of the input binary sequence equivalent to a binary 0 onto a real number of the sequence equivalent to −1, and the bit of the input binary sequence equivalent to a binary 1 onto a real number of the sequence equivalent to 1.

12. A method as claimed in claim 11 wherein the executing complex arithmetic operations is performed in parallel for at least two complex arithmetic operations.

13. A non-transitory computer readable medium embodying a computer program comprising instructions for causing a processor unit to perform a method of mapping L input binary sequences of N bits onto M complex values, the M complex values being transmitted through a communication channel, $M=2^N$, being L and N positive integers, the method comprising:
    receiving a respective one of the L input binary sequences;
    converting individually each N bits of the input binary sequence into a real number to obtain a sequence of real numbers with N real numbers corresponding to the respective input binary sequence;
    executing complex arithmetic operations on the sequence of real numbers to compute a respective complex value of the M complex values, the respective complex value corresponding to said respective input binary sequence, wherein the executing further comprises:
        multiplying a first real number by the imaginary number j to obtain a first intermediate product;
        summing the first intermediate product with a second real number to obtain a first sum;
        subtracting a third real number and the imaginary number j to obtain a difference;
        multiplying the first sum with said difference to obtain a second intermediate product;
        compute a real part of said second intermediate product to obtain a real part;

multiplying a second number equivalent to $$-\frac{\sqrt{2}-1+j}{4}$$

with the modulus of said real part to obtain a third intermediate product;

summing a first number equivalent to $$\frac{\sqrt{2}}{2}$$

with said third intermediate product to obtain a second sum; and multiplying the first sum with second sum to obtain the respective complex value corresponding to the respective input binary sequence; and mapping the computed M complex values onto a single constellation diagram, wherein the M-order digital modulation is an 8-PSK modulation, the respective input binary sequence of N bits has three bits, the sequence of real numbers has three real numbers, and wherein the converting converts the bit of the input binary sequence equivalent to a binary 0 onto a real number of the sequence equivalent to −1, and the bit of the input binary sequence equivalent to a binary 1 onto a real number of the sequence equivalent to 1.

14. The non-transitory computer readable medium of claim 13, wherein the executing complex arithmetic operations is performed in parallel for at least two complex arithmetic operations.

\* \* \* \* \*